(12) United States Patent
Oshima

(10) Patent No.: US 10,340,056 B2
(45) Date of Patent: Jul. 2, 2019

(54) FLAT CABLE AND WIRE HARNESS

(71) Applicant: Yazaki Corporation, Tokyo (JP)

(72) Inventor: Takeshi Oshima, Susono (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/051,743

(22) Filed: Aug. 1, 2018

(65) Prior Publication Data
US 2019/0088387 A1 Mar. 21, 2019

(30) Foreign Application Priority Data

Sep. 19, 2017 (JP) ................. 2017-178582

(51) Int. Cl.
| H01B 7/02 | (2006.01) |
| H01B 7/00 | (2006.01) |
| H01B 7/08 | (2006.01) |
| H01B 7/40 | (2006.01) |
| H01M 2/20 | (2006.01) |
| H01M 10/48 | (2006.01) |
| H01R 12/65 | (2011.01) |
| H01B 3/44 | (2006.01) |
| H01R 4/02 | (2006.01) |
| H01R 4/30 | (2006.01) |
| H01R 12/77 | (2011.01) |

(52) U.S. Cl.
CPC ......... *H01B 7/0275* (2013.01); *H01B 7/0045* (2013.01); *H01B 7/08* (2013.01); *H01B 7/40* (2013.01); *H01M 2/202* (2013.01); *H01M 10/482* (2013.01); *H01R 12/65* (2013.01); *H01B 3/443* (2013.01); *H01R 4/023* (2013.01); *H01R 4/30* (2013.01); *H01R 12/77* (2013.01)

(58) Field of Classification Search
CPC combination set(s) only.
See application file for complete search history.

(56) References Cited

U.S. PATENT DOCUMENTS

| 3,678,437 A * | 7/1972 | Vaden ................. H05K 3/4084 174/261 |
| 4,218,581 A * | 8/1980 | Suzuki ................ H01B 7/0823 174/117 F |
| 6,661,563 B2 * | 12/2003 | Hayashi ................. G09F 9/372 345/107 |

(Continued)

FOREIGN PATENT DOCUMENTS

| JP | 2009-158231 A | 7/2009 |
| JP | 2016-24933 A | 2/2016 |

*Primary Examiner* — William H. Mayo, III
*Assistant Examiner* — Krystal Robinson
(74) *Attorney, Agent, or Firm* — Sughrue Mion, PLLC

(57) ABSTRACT

A flat cable includes at least one cable portion and at least one rib portion. The at least one cable portion has a plurality of conductor wires arranged in parallel at predetermined intervals on a plane, and a coating portion that collectively covers the plurality of conductor wires arranged in parallel. The coating portion is made of an insulating resin. The at least one rib portion is provided in parallel with the cable portion on the plane. bus bar is to be fixed to the at least one rib portion and the at least one rib portion is made of only the same resin as the coating portion. A body including the at least one cable portion and the at least one rib portion is substantially bilaterally symmetrical in a cross-sectional structure of the body.

11 Claims, 7 Drawing Sheets

(56) References Cited

U.S. PATENT DOCUMENTS

| | | | | |
|---|---|---|---|---|
| 8,724,832 B2* | 5/2014 | Stephanou | ............. | G01H 11/08 |
| | | | | 381/173 |
| 9,196,887 B2* | 11/2015 | Sasada | ................. | H01M 2/206 |
| 10,014,510 B2* | 7/2018 | Ichikawa | ............. | H01M 2/206 |
| 10,026,943 B2* | 7/2018 | Ichikawa | ............. | H01M 2/202 |
| 2001/0010985 A1* | 8/2001 | Kasai | .................. | H01R 9/2458 |
| | | | | 439/638 |
| 2004/0168820 A1* | 9/2004 | Kanamori | ............ | C08F 255/02 |
| | | | | 174/110 R |
| 2012/0328920 A1* | 12/2012 | Takase | ................ | H01M 2/1077 |
| | | | | 429/90 |
| 2013/0161053 A1* | 6/2013 | Okamoto | ............ | H01M 2/206 |
| | | | | 174/68.1 |
| 2014/0212732 A1* | 7/2014 | Ichikawa | ............. | H01M 2/206 |
| | | | | 429/158 |
| 2014/0370343 A1* | 12/2014 | Nomoto | ............ | H01M 10/4207 |
| | | | | 429/90 |
| 2015/0068802 A1* | 3/2015 | Kajiwara | ............ | H02G 3/0487 |
| | | | | 174/72 A |
| 2016/0172652 A1* | 6/2016 | Ichikawa | ............. | H01M 2/206 |
| | | | | 429/121 |
| 2017/0110705 A1 | 4/2017 | Tosaya et al. | | |

\* cited by examiner

FIG. 7

| ITEM | | | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|---|---|
| | | | RIBS ON BOTH ENDS AND CABLE AT A CENTER | RIBS ON BOTH ENDS AND CABLE AT A CENTER | CABLES ON BOTH ENDS AND RIB AT A CENTER | CABLES ON BOTH ENDS AND RIB AT A CENTER | RIB ON ONE SIDE AND CABLE ON THE OTHER SIDE | RIBS ON BOTH ENDS AND CABLE AT A CENTER | RIBS ON BOTH ENDS AND CABLE AT A CENTER | CABLES ON BOTH ENDS AND RIB AT A CENTER |
| RIB PORTION | MATERIAL | — | PVC | PVC | PVC | PVC | PVC | PVC | PVC | PVC |
| | WIDTH OF RIB PORTION ① | mm | 6.0 | 6.0 | 6.0 | 6.0 | 6.0 | 6.0 | 6.0 | 6.5 |
| | THICKNESS OF RIB PORTION ① | mm | 1.2 | 1.2 | 1.2 | 1.2 | 1.2 | 1.2 | 1.2 | 1.2 |
| | WIDTH OF RIB PORTION ② | mm | 6.0 | 5.5 | — | — | — | 6.0 | 5.0 | — |
| | THICKNESS OF RIB PORTION ② | mm | 1.2 | 1.2 | — | — | — | 1.4 | 1.1 | — |

| | | SIZE | sq | 0.35 | 0.35 | 0.35 | 0.35 | 0.35 | 0.35 | 0.35 | 0.35 |
|---|---|---|---|---|---|---|---|---|---|---|---|
| CABLE PORTION | CONDUCTOR WIRE | NUMBER OF CONDUCTIVE WIRES | — | 5 CONDUCTOR WIRES | 5 CONDUCTOR WIRES | 10 CONDUCTOR WIRES (5 CONDUCTOR WIRES PLUS 5 CONDUCTOR WIRES) | 9 CONDUCTOR WIRES (5 CONDUCTOR WIRES PLUS 4 CONDUCTOR WIRES) | 5 CONDUCTOR WIRES | 5 CONDUCTOR WIRES | 5 CONDUCTOR WIRES | 9 CONDUCTOR WIRES (5 CONDUCTOR WIRES PLUS 4 CONDUCTOR WIRES) |
| | COATING PORTION | MATERIAL | — | PVC | PVC | PVC | PVC | PVC | PVC | PVC | PVC |
| RATIO OF RESIN ON THE LEFT PART AND RIGHT PART | | | — | 1:1 | 1:0.91 | 1:1 | 1:0.85 | UNSYMMETRIC STRUCTURE | 1:0.8 | 1:0.76 | 1:0.75 |
| AMOUNT OF WRAPAGE | | | mm | 1.0 | 2.0 | 1.0 | 2.0 | 8.5 | 4.1 | 5.5 | 6.5 |

FLAT CABLE AND WIRE HARNESS

CROSS REFERENCE TO RELATED APPLICATIONS

This application is based on Japanese Patent Application (No. 2017-178582) filed on Sep. 19, 2017, the contents of which are incorporated herein by reference.

BACKGROUND OF THE INVENTION

1. Field of the Invention

The present invention relates to a flat cable and a wire harness.

2. Description of the Related Art

There has been known a battery module to be mounted on hybrid automobiles or electric automobiles as a battery. The battery module is configured by stacking a plurality of battery cells in a thickness direction thereof and accommodating the battery cells in a housing. For example, a lithium-ion battery or a secondary battery is used as the battery cell. The battery module is provided with a bus bar, through which electrode terminals of the battery cells are electrically connected to each other, and a voltage detection wire for detecting a voltage state of each of the battery cells.

In order to perform electric connection to such a battery module, a bus bar module integrating the bus bar and the voltage detection wire has been proposed (see JP-A-2016-24933). In the bus bar module, a cable portion including a plurality of conductor wires is provided on one end of the bus bar module and a plate conductor is provided on the other end of the bus bar module.

However, in the bus bar described in JP-A-2016-24933, the cable portion including a plurality of conductor wires and the plate conductor serving as the bus bar are integrally molded, therefore molding speed is slow, and productivity thereof is not so high.

For this reason, the applicants of the present invention have studied to use a flat cable including a rib portion for fixing the bus bar to replace the bus bar module. That is, the applicants of the present invention have studied that, for example, a rib portion formed of resin is provided to replace the plate conductor of the bus bar module described in JP-A-2016-24933, and the bus bar is stacked and fixed to the rib portion in a subsequent process.

However, for the flat cable including the rib portion, a coating resin is difficult to flow evenly during extrusion molding. That is, since the rib portion is formed of resin only, the coating resin flows easily to a rib portion side, which is a reason why the flat cable after molding tends to warp, and straightness thereof tends to deteriorate.

Here, the flat cable including the rib portion is mounted to the battery module, and is connected to a predetermined bus bar after a plurality of conductor wires are cut off together with the coating portion one by one. Due to work efficiency, the cutting operation is performed by a cutting machine, which performs straight cutting, instead of manual operation by worker, so that the straightness may deteriorate.

SUMMARY OF THE INVENTION

The present invention has been made to solve such conventional problems, and an object thereof is to provide a flat cable capable of suppressing deterioration of straightness in a case of including the rib portion, and a wire harness.

The flat cable of the present invention includes:
at least one cable portion which includes:
 a plurality of conductor wires arranged in parallel at predetermined intervals on a plane; and
 a coating portion that collectively covers the plurality of conductor wires arranged in parallel, the coating portion being made of an insulating resin; and
at least one rib portion provided in parallel with the cable portion on the plane and to which a bus bar is to be fixed, and the at least one rib portion is made of only the same resin as the coating portion,
wherein a body including the at least one cable portion and the at least one rib portion is substantially bilaterally symmetrical in a cross-sectional structure of the body.

According to the flat cable, since the arrangement of the cable portion and the rib portion in the body is substantially bilaterally symmetrical in the cross-sectional structure thereof, the insulating resin is prevented from being easily biased toward one side of the cross section in the body, and occurrence of warpage of the flat cable can be suppressed. Accordingly, the deterioration of straightness of the flat cable can be suppressed.

Further, for example, the at least one cable portion has a first cable portion and a second cable portion, and the first cable portion, the rib portion, and the second cable portion are arranged in the body on the plane in this order.

Also, for example, an object arranged at a center in the body in a cross-section thereof is the rib portion, a central portion of the rib portion of the body in the cross-section is set as a boundary line, and a ratio of amounts of resin in a left part and right part of the body is 1:0.85 or more when one part of the body having a larger amount of resin is set to 1, the left part of the body being arranged at left side from the boundary line and the right part of the body being arranged at right side from the boundary line.

Further, for example, the at least one rib portion has a first rib portion and a second rib portion, and the first rib portion, the cable portion, and the second rib portion are arranged in the body on the plane in this order.

Also, for example, an object arranged at a center in the body in a cross-section thereof is the cable portion, a central position between the conductor wires arranged at most end sides of the cable portion in the cross-section is set as a boundary line, and a ratio of amounts of resin in a left part and right part of the body is 1:0.85 or more when one part of the body having a larger amount of resin is set to 1, the left part of the body being arranged at left side from the boundary line and the right part of the body being arranged at right side from the boundary line.

According to the flat cable, since the ratio of amounts of resin on the left part and the right part in the body is 1:0.85 or more, symmetry of both parts is improved and the occurrence of warpage is further suppressed, so that a more suitable flat cable to be used in a battery module can be provided.

Further, in the flat cable of the present invention, a thickness difference between the left part of the body and the right part of the body is 10% or less.

Further, since the thickness difference of the resin on the left part and the right part is 10% or less, flowability of the resin changes due to the thickness difference, and the deterioration of straightness can be suppressed.

Further, a wire harness of the present invention includes the flat cable according to any one of the flat cables described above.

According to the wire harness, the wire harness including the flat cable capable of suppressing the deterioration of straightness can be provided.

According to the present invention, a flat cable capable of suppressing deterioration of straightness in a case of including a rib portion, and a wire harness can be provided.

BRIEF DESCRIPTION OF THE DRAWINGS

FIG. 7 is a table showing test results of flat cables according to examples and comparative examples.

DETAILED DESCRIPTION OF THE EXEMPLARY EMBODIMENTS

Hereinafter, the present invention will be described in accordance with preferred embodiments. Incidentally, the present invention is not limited to the embodiments described below and can be appropriately changed without departing from the spirit of the present invention. Further, in the embodiments described below, there are places where illustration and explanation of a part of the configuration are omitted, and for the details of the omitted technique, it goes without saying that known or well-known techniques may be appropriately applied within a range not inconsistent with the contents to be described below.

Figure 1:
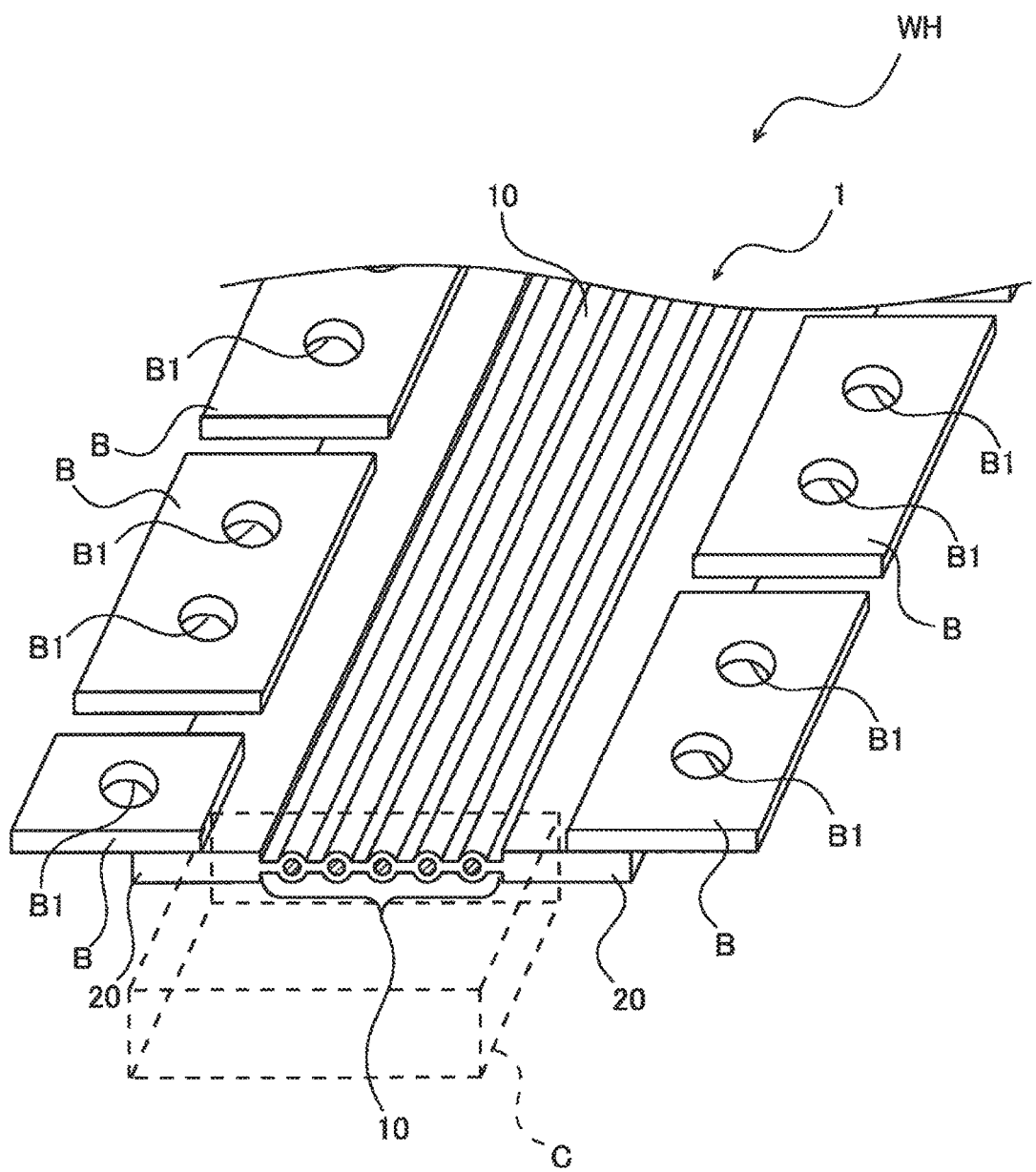
FIG. 1 is a perspective view of a wire harness including a flat cable according to an embodiment of the present invention.

FIG. 1 is a perspective view of a wire harness including a flat cable according to an embodiment of the present invention. As shown in FIG. 1, a wire harness WH includes a flat cable 1, a plurality of bus bars B, and a connector C.

The plurality of bus bars B are conductor plates including through holes B1 into which a positive terminal and a negative terminal of adjacent battery cells in the plurality of battery cells configuring the battery module are inserted. Since the plurality of bus bars B are each provided between terminals of adjacent battery cells, the battery cells can be electrically connected in series.

The connector C is provided at an end portion of the flat cable 1, and is connected to a connector on a side of a monitor device for monitoring a battery voltage. The flat cable 1 includes a plurality of conductor wires (with a later-described reference numeral 11), and a specific conductor wire is connected to a specific bus bar B (illustration of connection to the bus bar B is omitted in FIG. 1).

Figure 2:
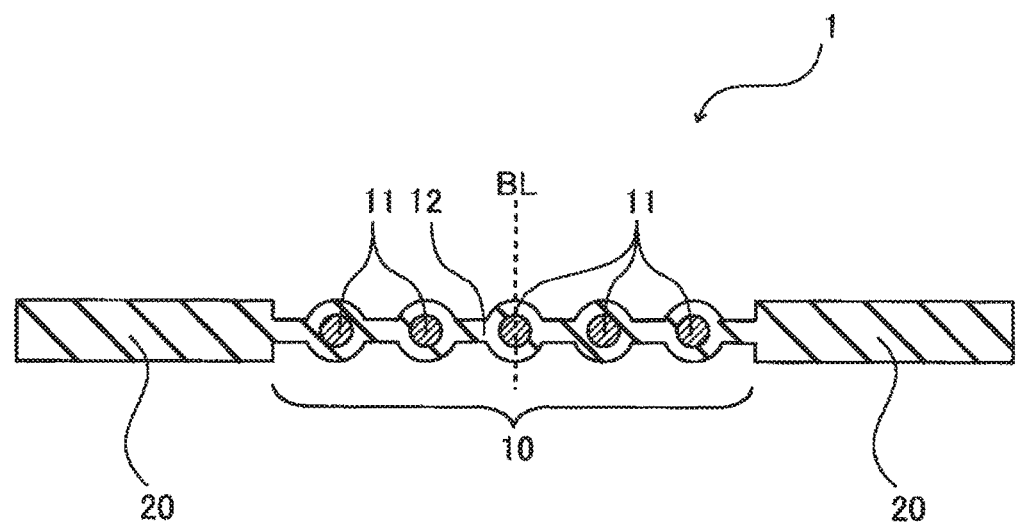
FIG. 2 is a cross-sectional view of the flat cable shown in FIG. 1.

FIG. 2 is a cross-sectional view of the flat cable 1 shown in FIG. 1. As shown in FIG. 2, the flat cable 1 includes a body having a cable portion 10 and rib portions 20. The cable portion 10 includes a plurality of conductor wires 11 and a coating portion 12.

The plurality of conductor wires 11 are formed of copper, aluminum or an alloy thereof, and are arranged in parallel at predetermined intervals on a plane. In the coating portion 12, an insulating resin collectively covers the plurality of conductor wires 11 which are arranged in parallel. In the embodiment, the insulating resin is polyvinyl chloride resin, for example.

Each of the rib portions 20 is a part formed of an insulating resin only, and is formed of the same resin as the insulating resin forming the coating portion 12 in the embodiment. The rib portion 20 is provided to be in parallel with the plurality of conductor wires 11 on the plane on which the plurality of conductor wires 11 are arranged in parallel. As shown in FIG. 1, the bus bar B is stacked and fixed on the rib portion 20. The bus bar B is fixed to the rib portion 20 by bolt tightening (not shown) or caulking (not shown). Incidentally, in view of fixing the bus bar B, the rib portion 20 is formed to at least have a thickness of 0.3 mm or more and a width of 1.0 mm or more (more preferably, the width is 2.0 mm or more). Further, in FIGS. 1 and 2, the rib portion 20 has a rectangular shape, but the shape is not limited to the rectangular shape as long as the bus bar B can be fixed thereon, such as an oval shape or an elliptic shape.

Generally, for the flat cable 1 including the rib portion 20, the insulating resin to be coated is difficult to flow evenly during extrusion molding. That is, since the rib portion 20 is formed of resin only, the insulating resin easily flows to the rib portion 20, and is difficult to flow to the cable portion 10 in the body. For this reason, the flat cable 1 after molding tends to warp and straightness thereof tends to deteriorate.

Here, the body of the flat cable 1 in the embodiment is substantially bilaterally symmetrical in a cross-sectional structure thereof. Accordingly, equalized flow of the resin on the left and right is achieved, thus preventing the warpage of the flat cable 1.

Specifically, in the flat cable 1 shown in FIG. 2, an object arranged at a center in a cross section of the body is the cable portion 10, and the rib portions 20 with the same shape are provided on both sides of the cable portion 10 so as to be bilaterally symmetrical. That is, in the cross-sectional structure, the rib portion 20, the cable portion 10, and the rib portion 20 are arranged in this order and the arrangement of the body of the flat cable 1 is bilaterally symmetrical.

Figure 3:
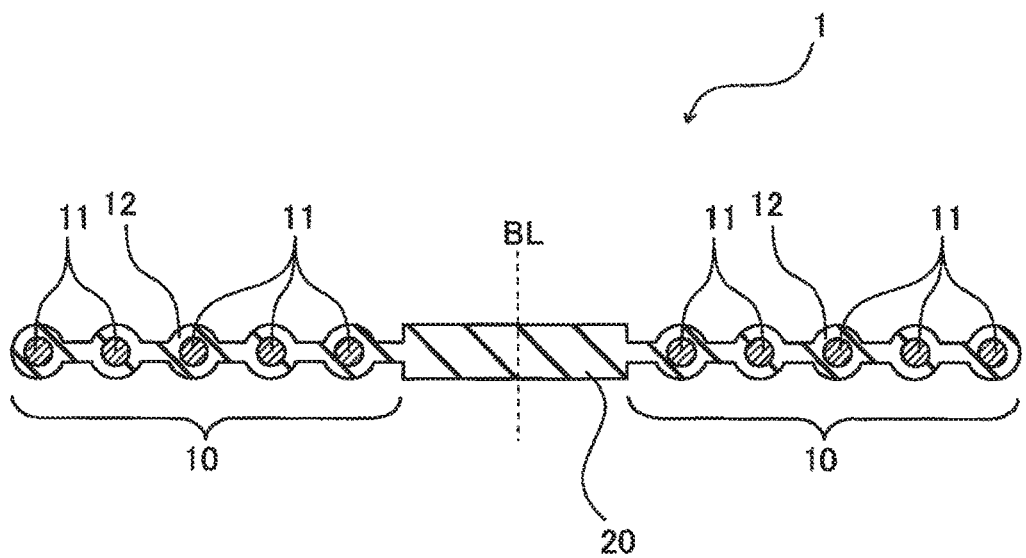
FIG. 3 is a cross-sectional view showing a first modification of the flat cable according to the embodiment.

Incidentally, the flat cable 1 is not limited to the shape shown in FIG. 2. FIGS. 3 to 6 are cross-sectional views showing modifications of the body of the flat cable 1 according to the embodiment. As shown in FIG. 3, the flat cable 1 may be configured such that an object arranged at a center in a cross section of the body is the rib portion 20, and the cable portions 10 are provided on both sides of the rib portion 20, so that an arrangement of the cable portions 10 and the rib portion 20 are bilaterally symmetrical. Each of the cable portions 10 has five conductor wires 11, and these five conductor wires 11 are covered with the coating portion 12.

Figure 4:
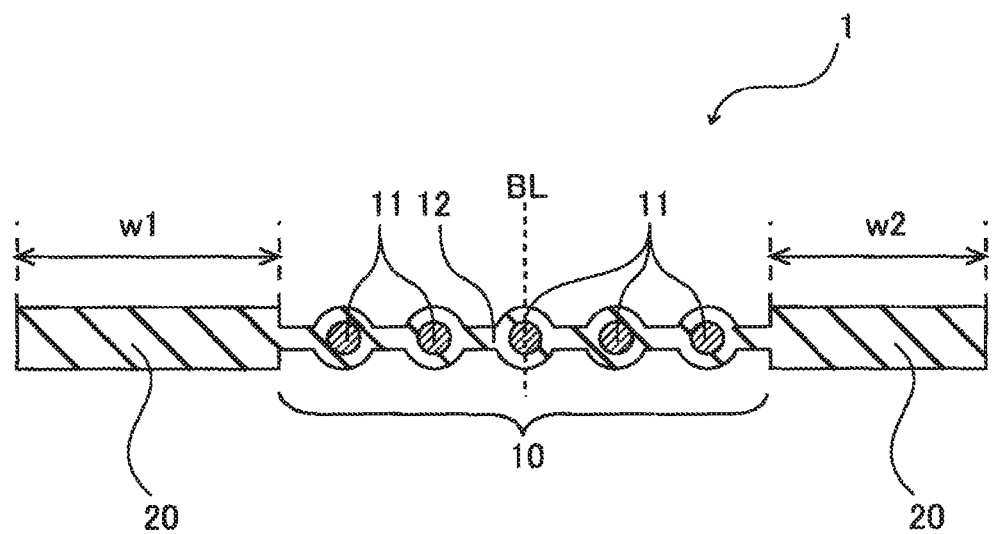
FIG. 4 is a cross-sectional view showing a second modification of the flat cable according to the embodiment.

Further, as shown in FIG. 4, the flat cable 1 may be configured such that the object arranged at the center in the cross section of the body of the flat cable 1 is the cable portion 10, and the rib portions 20 with different widths are provided on both sides of the cable portion 10, so that an arrangement of the cable portion 10 and the rib portions 20 are substantial bilaterally symmetrical. Both rib portions 20 have the same thickness, but one has a width w1, and the other has a width w2 (<w1).

Figure 5:
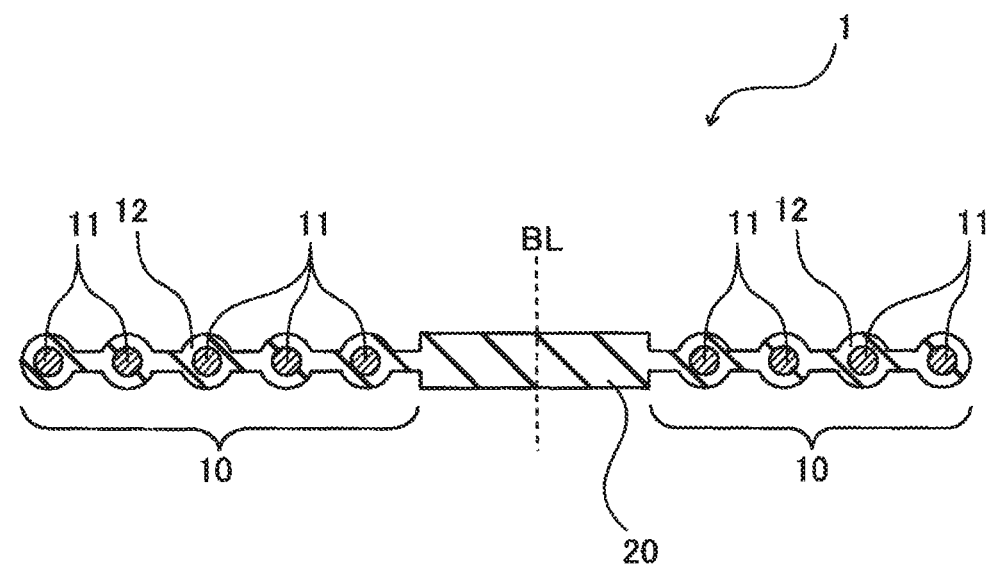
FIG. 5 is a cross-sectional view showing a third modification of the flat cable according to the embodiment.

Further, as shown in FIG. 5, the flat cable 1 may be configured such that the object arranged at the center of the body of the flat cable 1 in the cross section is the rib portion 20, and the cable portions 10 with different numbers of conductor wires 11 are provided on both sides of the rib portion 20, so that an arrangement of the cable portions 10 and the rib portion 20 are substantial bilaterally symmetrical. One of the cable portions 10 is configured such that five conductor wires 11 are covered with the coating portion 12, and the other cable portion 10 is configured such that four conductor wires 11 are covered with the coating portion 12.

Figure 6:
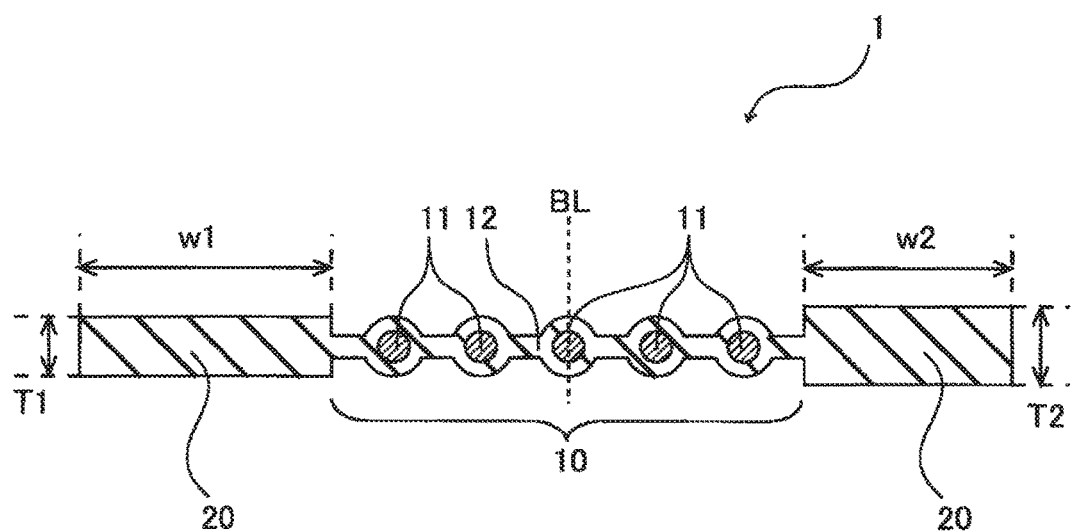
FIG. 6 is a cross-sectional view showing a fourth modification of the flat cable according to the embodiment.

Further, as shown in FIG. 6, the flat cable 1 may be configured such that the object arranged at the center of the body of the flat cable 1 in the cross section is the cable portion 10, and the rib portions 20 with different widths and thicknesses are provided on both sides of the cable portion 10, so that an arrangement of the cable portion 10 and the rib portions 20 are substantial bilaterally symmetrical. One rib portion 20 has a thickness T1 and a width w1, and the other rib portion has a thickness T2 (>T1) and a width w2 (<w1).

Incidentally, the above substantial symmetry is a concept including not only that the arrangement of the cable portion 10 and the rib portion 20 is bilaterally symmetrical but also that a ratio of amounts of resin on the left part and the right part arranged in the body from a boundary line BL exceeds 1:0.8. In a case where the object arranged at the center in the cross section of the body is the rib portion 20, the boundary line BL is a central part in a cross section of the rib portion 20, and in a case where the object arranged at the center in the cross section is the cable portion 10, the boundary line BL is at a central position between the conductor wires 11 on both end sides (most end sides) of the cable portion 10. Further, the "1" in the above ratio is one of the left and right parts with a larger amount of resin.

Further, in the flat cable 1 of the embodiment, a ratio of amounts of resin on the left part and right part is preferably 1:0.85 or more. For example, a distance between the conductor wires 11 of the flat cable 1 to be mounted on the battery module is for example about 2 mm, and that is because the amount of warpage of the flat cable 1 can be 2 mm or less if the ratio of amounts of resin is set as described above.

In addition, a thickness difference on the left part and the right part of the body in view of the boundary line BL is for example within 10%. Specifically, in a case where one part of the left and right parts with thicker thickness is set as T1, a thickness T2 of the other part with thinner thickness is for example 0.91*T1 or more. This is because flowability of the resin changes due to the thickness difference, and the deterioration of straightness can be suppressed.

In the flat cable 1, a plurality of bus bars B are first attached to the rib portion 20. The attachment method may be bolt tightening or may be caulking. Then, a terminal of the battery cell is inserted into the through hole B1 of the bus bar B and fixed by a nut. Next, each conductor wire 11 of the cable portion 10 of the flat cable 1 is connected (welded) to a predetermined bus bar B.

Here, in the flat cable 1 of the embodiment, the warpage is suppressed and the straightness is improved, so that the flat cable is also applicable to cutting performed by a cutting machine before each conductor wire 11 is connected to the predetermined bus bar B.

Next, examples and comparative examples of the flat cable 1 according to the embodiment will be described. FIG. 7 is a table showing test results of flat cables according to the examples and comparative examples.

As shown in FIG. 7, a flat cable according to Example 1 was configured such that, as shown in FIG. 2, an object at a center is the cable portion. Materials of the cable portion and the rib portion were polyvinyl chloride (PVC). A width of one rib portion in rib portions on both sides was set to 6.0 mm, and a thickness thereof was set to 1.2 mm. Similarly, a width of the other rib portion was set to 6.0 mm, and a thickness thereof was set to 1.2 mm. In the cable portion, a number of the conductor wires was set to 5, and a size of each conductor wire was set to 0.35 sq. Further, a ratio of the resin on the left and right was set to 1:1.

A flat cable according to Example 2 was configured such that, as shown in FIG. 4, the object at the center is the cable portion, and the rib portions on both sides have different widths. Specifically, the flat cable was set to be the same as that in Example 1 excluding that a width of the other rib portion was set to 5.5 mm, and a ratio of the resin on the right and left was set to 1:0.91.

A flat cable according to Example 3 was configured such that, as shown in FIG. 3, the object at the center is the rib portion. Materials of the cable portion and the rib portion were polyvinyl chloride (PVC). A width of the rib portion at the center was set to 6.0 mm, and a thickness thereof was set to 1.2 mm. In the cable portions on both sides, numbers of the conductor wires were each set to 5, and a size of each conductor wire was set to 0.35 sq. A ratio of the resin on the left and right was set to 1:1.

A flat cable according to Example 4 was configured such that, as shown in FIG. 5, the object at the center is the rib portion, and the cable portions on both sides have different numbers of conductor wires. Specifically, the flat cable was set to be the same as that in Example 3 excluding that a number of the conductor wires of one cable portion in the cable portions on both sides was set to 4, and a ratio of the resin on the right and left was set to 1:0.85.

A flat cable according to Comparative Example 1 was configured such that one side thereof was provided with the cable portion, and the other side was provided with the rib portion. That is, an arrangement of the flat cable according to Comparative Example 1 was set to be not bilaterally symmetrical. Materials of the cable portion and the rib portion were polyvinyl chloride (PVC). A width of the rib portion was set to 6.0 mm, and a thickness thereof was set to 1.2 mm. In the cable portion, a number of the conductor wires was set to 5, and a size of each conductor wire was set to 0.35 sq.

A flat cable according to Comparative Example 2 was configured such that the object at the center is the cable portion, and the rib portions on both sides have different thicknesses. Specifically, the flat cable was set to be the same as that in Example 1 excluding that a thickness of the other rib portion was set to 1.4 mm, and a ratio of the resin on the right and left was set to 1:0.8.

A flat cable according to Comparative Example 3 was configured such that the object at the center is the cable portion, and the rib portions on both sides have different widths and thicknesses. Specifically, the flat cable was set to be the same as that in Example 1 excluding that a width of the other rib portion was set to 5.0 mm, a thickness thereof was set to 1.1 mm, and a ratio of resin on the right and left was set to 1:0.76.

A flat cable according to Comparative Example 4 was configured such that an object at the center is a rib portion, and the cable portions on both sides have different numbers of conductor wires. Materials of the cable portion and the rib portion were polyvinyl chloride (PVC). A width of the rib portion at the center was set to 6.5 mm, and a thickness thereof was set to 1.2 mm. A number of the conductor wires of one cable portion in the cable portions on both sides was set to 5, a number of the conductor wires of the other cable portion was set to 4, and a size of each conductor wire was set to 0.35 sq. Further, a ratio of the resin on the left and right was set to 1:0.75.

Figure 8:
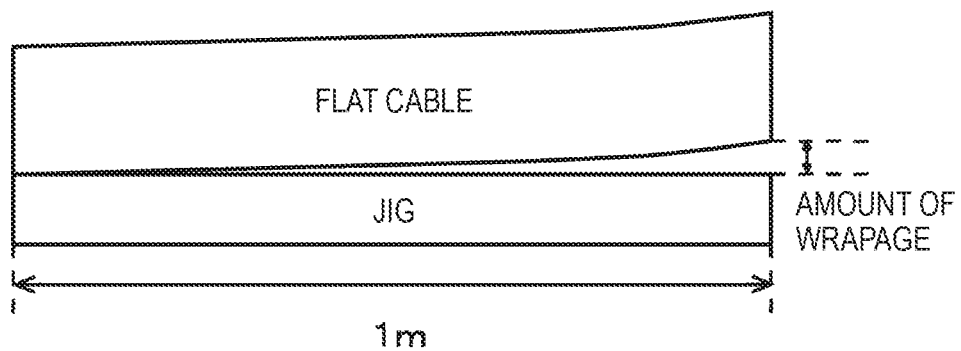
FIG. 8 is a top view showing a method for measuring an amount of warpage.

Amounts of warpage of the flat cables according to Examples 1 to 4 and Comparative Examples 1 to 4 were measured. FIG. 8 is a top view showing a method for measuring the amount of warpage. As shown in FIG. 8, one end of the flat cables according to Examples 1 to 4 and Comparative Examples 1 to 4 is in close contact with a straight jig. Here, a length of the flat cable was set to 1 m and a distance that the other end is away from the jig was defined as the amount of warpage. Further, a distance between conductor wires in the flat cables according to Examples 1 to 4 and Comparative Examples 1 to 4 was set to 2 mm. Therefore, an amount of warpage of 2 mm or less was defined as an acceptance line.

An amount of warpage of Example 1 was 1.0 mm. Further, amounts of warpage of Examples 2 to 4 were 2.0 mm, 1.0 mm, and 2.0 mm in this order. In contrast, amounts of warpage of Comparative Examples 1 to 4 were 8.5 mm, 4.1 mm, 5.5 mm, and 6.5 mm respectively.

Accordingly, it was found that in order to reach the acceptance line of the amount of warpage of 2 mm or less, the ratio of the resin on the right and left is preferably 1:0.85 or more.

Incidentally, the acceptance line of the amount of warpage in the examples and comparative examples was set to 2 mm, but the present invention is not limited thereto, and depending on the battery module to be used, the acceptable line of the amount of warpage may be 2 mm or more. Although not shown as an example, it was also found that the amount of warpage becomes 4 mm or less if the ratio of resin on left and right exceeds 1:0.80.

Thus, according to the flat cable 1 of the embodiment, since the arrangement of the cable portion 10 and the rib portion 20 is bilaterally symmetrical in the cross-sectional structure thereof, the insulating resin is prevented from being easily biased toward one side of the cross section, and the occurrence of warpage is suppressed. Accordingly, the deterioration of straightness can be suppressed.

Further, since the ratio of amounts of resin on the left and right of the boundary line BL is 1:0.85 or more, symmetry of both parts are improved and the occurrence of warpage is further suppressed, so that a more suitable flat cable 1 used in the battery module can be provided.

Further, since the thickness difference of the resin on the left and right of the boundary line BL is 10% or less, the flowability of the resin changes due to the thickness difference, and the deterioration of straightness can be suppressed.

Further, according to the wire harness WH of the embodiment, a wire harness WH including the flat cable 1 capable of suppressing the deterioration of straightness can be provided.

The present invention has been described based on the embodiments, but the present invention is not limited to the embodiments described above and can be appropriately modified without departing from the spirit of the present invention, and may be appropriately combined with well-known and known techniques.

For example, the flat cables 1 shown in FIGS. 2 to 6 are configured such that the object arranged at the center is the cable portion 10 or the rib portion 20, and the rib portions 20 or the cable portions 10 are provided on both sides, but the present invention is not limited thereto, and the cable portion 10 or the rib portion 20 may be provided further outward of the rib portion 20 or the cable portion 10 on both sides.

Further, each conductor wire 11 in the flat cable 1 has the same size, but the present invention is not limited thereto, and a part of the conductor wires may have different sizes. In addition, the insulating resin used in the coating portion 12 and the rib portion 20 is not limited to polyvinyl chloride, and may be other insulating resins.

Further, the distance between the conductor wires in the flat cable 1 is not limited to 2 mm. Further, since the distance is not limited to 2 mm, if the amount of warpage of the flat cable with a length of 1 m is equal to or less than the distance between the conductor wires, the present invention is applicable to cutting machines in a case of to be used in the battery module.

What is claimed is:

1. A flat cable comprising:
   at least one cable portion which includes:
      a plurality of conductor wires arranged in parallel at predetermined intervals on a plane; and
      a coating portion that collectively covers the plurality of conductor wires arranged in parallel, the coating portion being made of an insulating resin; and
   at least one rib portion provided in parallel with the cable portion on the plane and to which a bus bar is to be fixed, and the at least one rib portion is made of only the same resin as the coating portion,
   wherein a body including the at least one cable portion and the at least one rib portion is substantially bilaterally symmetrical in a cross-sectional structure of the body;
   wherein the at least one cable portion has a first cable portion and a second cable portion;
   wherein the first cable portion, the rib portion, and the second cable portion are arranged in the body on the plane in this order;
   wherein an object arranged at a center in the body in a cross-section thereof is the rib portion, a central portion of the rib portion of the body in the cross-section is set as a boundary line; and
   wherein a ratio of amounts of resin in a left part and a right part of the body is 1:0.85 or more when one part of the body having a larger amount of resin is set to 1, the left part of the body being arranged at a left side from the boundary line and the right part of the body being arranged at a right side from the boundary line.

2. A flat cable comprising:
   at least one cable portion which includes:
      a plurality of conductor wires arranged in parallel at predetermined intervals on a plane; and
      a coating portion that collectively covers the plurality of conductor wires arranged in parallel, the coating portion being made of an insulating resin; and
   at least one rib portion provided in parallel with the cable portion on the plane and to which a bus bar is to be fixed, and the at least one rib portion is made of only the same resin as the coating portion,
   wherein a body including the at least one cable portion and the at least one rib portion is substantially bilaterally symmetrical in a cross-sectional structure of the body;
   wherein the at least one rib portion has a first rib portion and a second rib portion;
   wherein the first rib portion, the cable portion, and the second rib portion are arranged in the body on the plane in this order;
   wherein an object arranged at a center in the body in a cross-section thereof is the cable portion, a central position between the conductor wires of the cable portion in the cross-section is set as a boundary line; and wherein a ratio of amounts of resin in a left part and a right part of the body is 1:0.85 or more when one part of the body having a larger amount of resin is set to 1, the left part of the body being arranged at a left side from the boundary line and the right part of the body being arranged at a right side from the boundary line.

3. The flat cable according to claim 2, wherein a thickness difference between the left part of the body and the right part of the body is 10% or less.

4. A wire harness comprising:
the flat cable according to claim 2.

5. The flat cable according to claim 2, wherein the first rib portion and the second rib portion have the same thickness.

6. The flat cable according to claim 5, wherein widths of the first rib portion and the second rib portion are different.

7. The flat cable according to claim 2, wherein the first rib portion has a smaller width and a larger thickness than the second rib portion.

8. The flat cable according to claim 1, wherein a thickness difference between the left part of the body and the right part of the body is 10% or less.

9. A wire harness comprising:
the flat cable according to claim 1.

10. The flat cable according to claim 1, wherein the at least one rib portion is formed to have a thickness of 0.3 mm or more and a width of 1.0 mm or more.

11. The flat cable according to claim 10, wherein the at least one rib portion is formed to have a width of 2.0 mm or more.

* * * * *